United States Patent [19]

Stead

[11] Patent Number: 4,623,189
[45] Date of Patent: Nov. 18, 1986

[54] OPEN SIDED TRAILER
[75] Inventor: Brian Stead, Blackpool, England
[73] Assignee: York Trailer Company Limited, England
[21] Appl. No.: 713,434
[22] Filed: Mar. 19, 1985
[30] Foreign Application Priority Data Mar. 30, 1984 [GB] United Kingdom ............... 8408272

[51] Int. Cl.4 .............................................. B60J 5/06
[52] U.S. Cl. .................................... 296/181; 296/183; 296/210; 52/45; 105/378; 105/404
[58] Field of Search ....................... 296/181, 210, 183; 52/45, 46, 47, 54; 105/378, 404

[56] References Cited

U.S. PATENT DOCUMENTS 3,820,476 6/1974 Harter et al. ........................ 52/45
4,545,611 10/1985 Broadbent .......................... 296/181

FOREIGN PATENT DOCUMENTS 131706 1/1985 European Pat. Off. ............ 296/181

Primary Examiner—Robert R. Song
Attorney, Agent, or Firm—Wood, Herron & Evans

[57] ABSTRACT

An open sided trailer construction in which a roof structure (4) is supported between front and rear frames (30,31) by a central fore and aft spine or web (5,21); the spine or web has lateral supports (8,26,27) extending either side of the web or spine which support a roof covering (4,28) and preferably extend to cantrails (7,20) from which hang curtains (3). The arrangement has the advantage that intermediate supports between the front and rear frame for the roof are not required and the cargo space within the trailer is easy to access and has a greater volume for a given trailer dimension than previous open sided trailer constructions.

9 Claims, 6 Drawing Figures

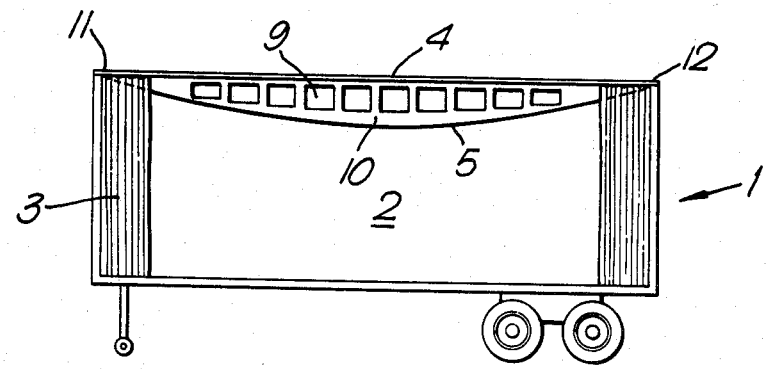
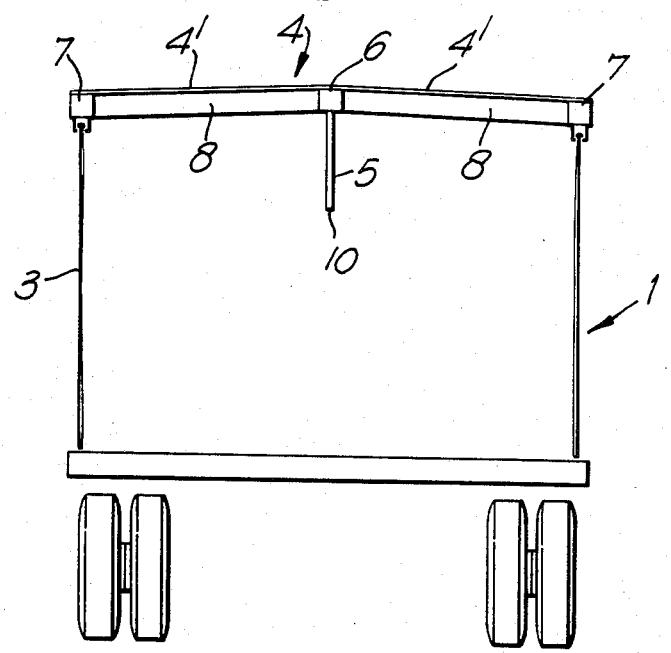

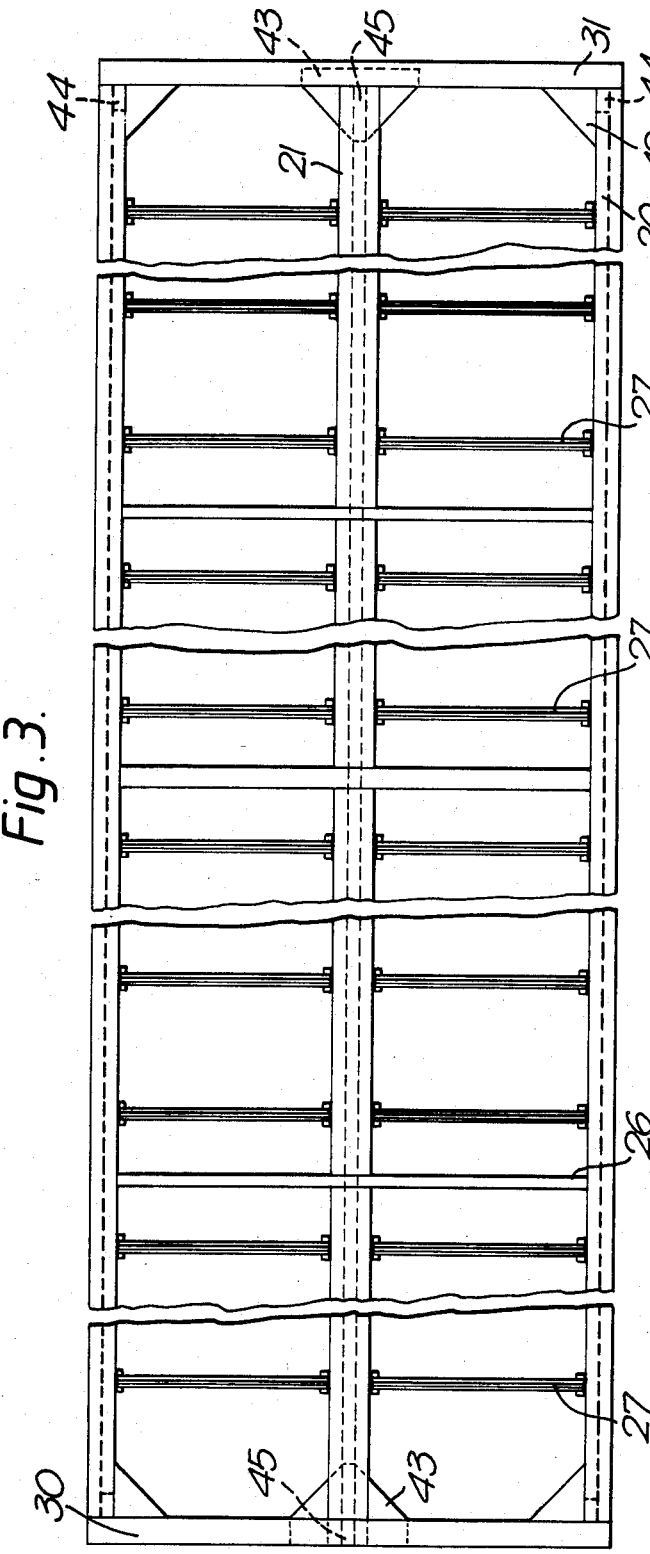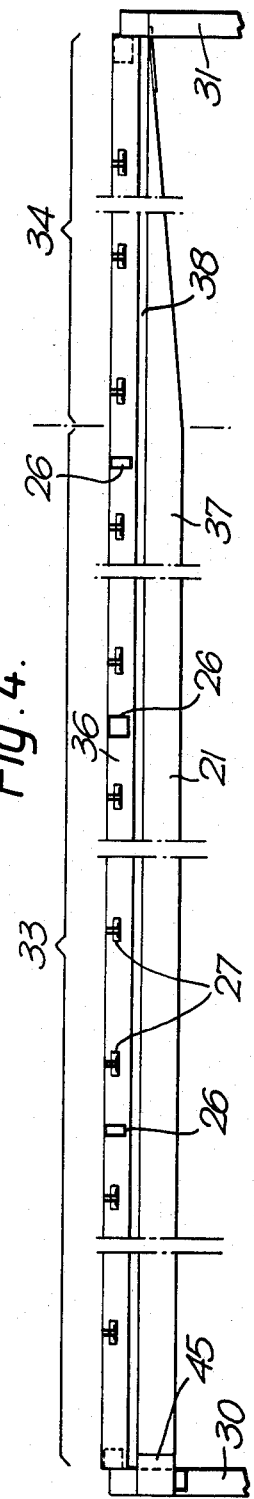

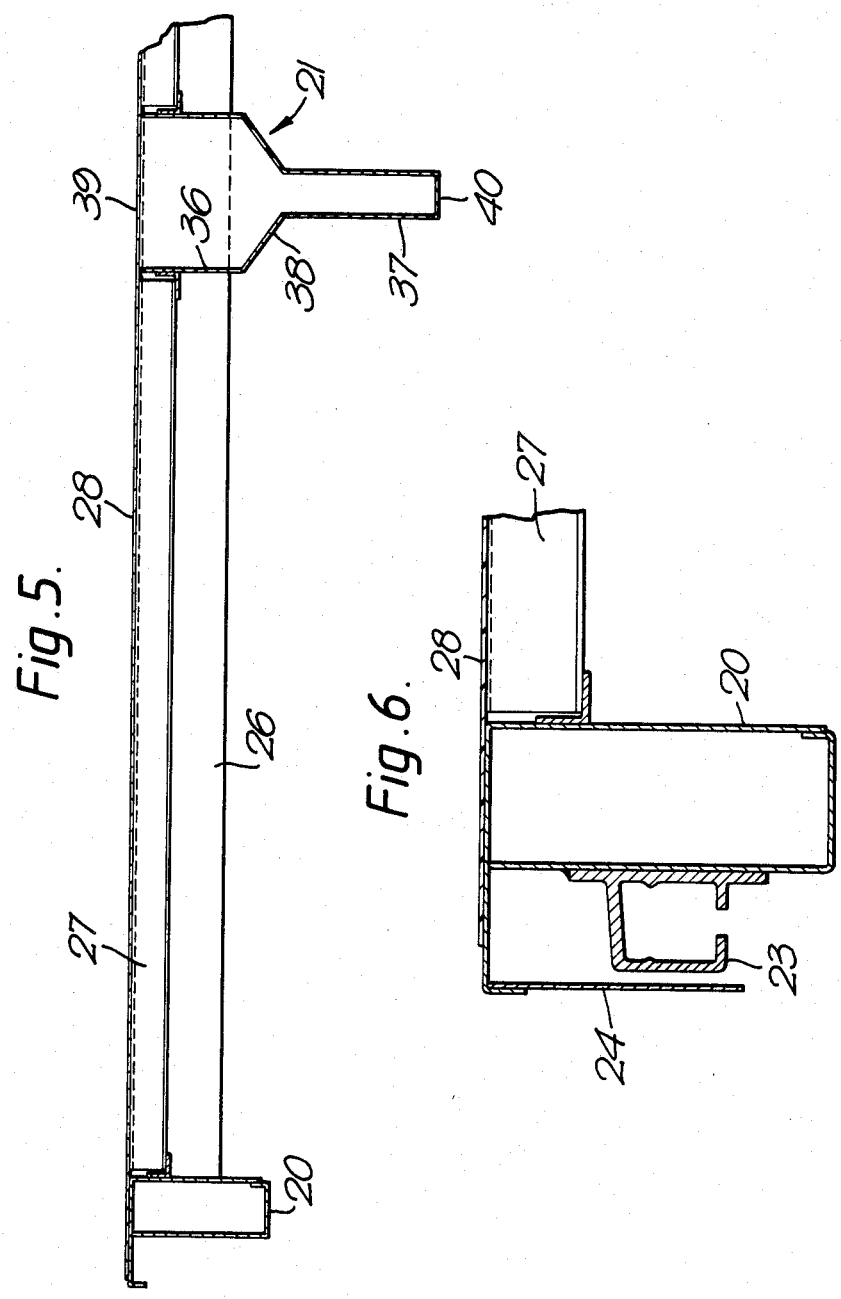

OPEN SIDED TRAILER

The present invention relates to open sided trailers.

Open sided trailers are normally provided with curtains along the sides and as such are referred to as curtain sides trailers. These comprise a chassis, a deck on the chassis, front and rear frames attached to the chassis and a roof structure partially supported by the front and rear frames. Movable curtains are suspended from the roof in such a way that they may be drawn aside to give access for loading or unloading. Since such trailers tend to be quite long (12.2 m or so in length) it has been the practice to provide support for the roof intermediate the front and rear frames by means of fixed uprights, removable or slidable uprights or intermediate bulkheads. These tend to reduce the deck space of the trailer or else obstruct loading and unloading.

An open sided trailer according to the present invention comprises a chassis, front and rear frames attached to the chassis and a roof structure characterised in that the roof structure is supported between the front and rear frames with no intermediate supports, the structure comprising a central fore and aft web extending from the roof vertically downwards a substantial roof supporting distance, lateral supports extending either side of the web and a roof covering.

The very deep central web provided ensures that easy unobstructed access is provided either side of the trailer and apart from drawing the curtains when they are provided there is nothing to be moved before unloading which is thereby easier and quicker.

Preferably the downwards extension of the web intermediate its extremities is between 1/20 and 1/40 and preferably about 1/35 of the length of the roof as taken between the inner sides of the front and rear frames. Thus a web depth of 350 mm is provided for a length intermediate the frames of 12,360 mm.

Since the roof top is normally about 8 feet (2.4 meters) about the deck a clearance of 6 feet (1.8 meters) or more results.

Further increase of the cargo space may be provided by ensuring that a considerable part of the central web is only 25 or 50 mm (1 or 2 inches) wide.

The roof structure suitably further comprises lateral fore and aft side beams 75 mm (3") or so square or else about 65 mm wide by 160 mm high from which depend side curtains. The central web may comprise a single member having an upper portion about 180 mm wide by about 125 mm high a lower portion about 50 mm wide by about 185 mm high and an intermediate upwardly and outwardly expanding portion. Alternatively the central web may comprise a composite beam formed of an upper square part 75 to 125 mm square with a depending part about 50 mm wide, the two parts totalling 300 to 600 (12 to 24 inches) in height intermediate in the front and rear end.

The central web can have a downward extension of only a few centimeters (inches) at either end and in a preferred embodiment the rear 1,845 mm of the central web of a total of 12,360 mm length has its lower extremity sloped upwardly from 350 mm in height to about 160 mm in height. That is to say the lower surface of the rear 15% of the total beam length is sloped upwardly.

The central web is preferably formed of a hollow construction of 1.6 mm (1/16") to 3.2 mm (⅛") and preferably 3 mm thick steel. The web may be apertured for lightness.

Embodiments of the invention will now be described by way of example with reference to the accompanying drawings in which:

FIG. 1 is a side view of a trailer according to the invention, and

FIG. 2 is a cross section of the trailer of FIG. 1.

FIG. 3 is a plan view of the roof structure of the trailer according to another embodiment of the invention, FIG. 4 is a cross sectional side view of the roof structure of FIG. 3, FIG. 5 is a transverse cross section of half of the roof structure of FIG. 3 showing the central web, and FIG. 6 is a detail of FIG. 5 showing the arrangement on the side of the roof for suspending a side curtain.

The trailer generally shown in FIG. 1 at 1 has open sides 2 which after loading are screened by drawable curtains 3. The roof 4 of aluminium sheeting 4' is about 12.4 meters (40 feet) long and supported by a central web or spine 5 depending from a fore and aft box beam 6 between lateral fore and aft box beam, 7 interconnected by transverse beams 8.

The central web is suitably 25 to 50 mm (1-2") wide and formed from 1.6 mm (1/16") to 3.2 mm (⅛") steel so that it is hollow. It has apertures 9 along its length and the height of the beam is about 300 to 600 mm (1.2 feet) at the intermediate point 10 and reduced in height at its extremities 11 and 12 to a few centimeters.

In order to reduce the height of the central web or spine, additional webs or spines can be provided adjacent the central longtitudinal position of the roof structure so that they are either side of the precise fore and aft median line of the trailer.

A more detailed construction of the roof structure of the trailer is shown in FIGS. 4 to 6. In this arrangement the roof structure consists of two fore and aft beams or cantrails which can vary in depth and width and form of construction but as shown are about 65 mm wide and 160 mm in height. The cantrails 20 carry a pelmet 24 and a track 23 from which side curtains (not shown) are drawably suspended.

The cantrails are at the outer extremities of the roof structure and are fixed to the outer ends of substantial cross members 26 as well as roof sticks 27 which support a sheet of aluminium forming a roof skin 28.

A roof formed only with the cross members, roof sticks and cantrails is insufficiently strong to be self supporting and therefore the cross members 26 and roof sticks 27 are fixed to a central web or spine 21 which extends the length of the trailer between front and rear frames 30 and 31 respectively. The spine can take various forms to suit a particular roof design but in the example shown in FIGS. 3 to 5 it consists a hollow beam of 3 mm thick steel 12,360 mm long of substantial uniform cross section in a main portion 33 and having a reducing portion 34 at its rear end. The rear portion 34 consists about 15% of the total beam length and the lower surface or extremity slopes upwardly from the full depth of 350 mm of the forward portion 33 to rather less than half the depth of the main portion of the spine to about 160 mm in total height. This slope enables the beam to be lightened and allows easier access at the rear of the trailer so as to clear rear doors if these are fitted.

The central spine 21 consists of a single member having an upper portion 36 about 180 mm wide by about 125 mm high, a lower portion 37 about 50 mm wide by about 185 mm high and an intermediate upwardly and outwardly expanding portion 38 such that the height of the spine 22 from its upper surface 39 to its lower surface 40 is about 350 mm. These dimensions apply for the main portion 33 of the beam or spine. Thus the downwards extension of the web intermediate its extremities half way along the spine is between one twentieth and one fortieth and in this case about one thirty-fifth of the total length of the roof as taken between inner sides of the front and rear frames 30 and 31. The length of the spine in this example as taken intermediate the frames is 12,360 mm.

Since the roof top is normally about 2.4 meters above the trailer deck a clearence of about 1.8 meters or more results under the central spine. Furthermore the spine is only 50 mm in width therefore very little cargo space is taken by the spine. Since the cantrails 20 extend downwardly about 160 mm from the roof top and the top of the lower and narrow portions 37 of the spine is about 165 mm from the roof top, substantially only the narrow portion 37 of the spine extends below the lower level of the cantrails. Thus only about 0.11 cu.m out of a total available 67.63 cu.m of cargo space in a typical standard 12.4 m trailer or 0.16% of the cargo space is invaded by the spine.

The roof structure including the cantrails 29 and spine 21 are fixed to the front and rear frames 30 and 31 by corner braces or plates 42 for the cantrails and end plates 43 for the spine. Furthermore spingots 44 extend from the front and rear frames into the hollow of the cantrails and further spigots 45 extend from the front and rear frames into the hollow of the lower portion 37 of the spine. The spigots are not welded to the roof structure. The spigots 44 are preferably welded to the front and rear frames to act as safety means in case of damage to roof. Thus if the roof structure became detached from the front and rear frames the spigots would still carry the weight of the roof.

I claim:

1. An open sided trailer comprising
   a chassis,
   a front frame and a rear frame, each of said frames extending vertically upward from and mounted to the front and rear ends, respectively, of said chassis,
   a side cantrail extending between and mounted to the upper extremities of said front and rear frames along each side of said chassis, each of said cantrails being generally parallel to said chassis' longitudinal axis, there being no intermediate supports provided between said chassis and said cantrails in the area between said front and rear frames,
   a roof covering said chassis, said roof being supported on its front, rear and side edges by said front and rear frames and said cantrails,
   a central spine extending between and mounted to the upper extremities of said front and rear frames, said central spine being located generally midway between said cantrails and generally parallel thereto, said central spine having a generally T-shaped cross sectional configuration with the foot of said T-shaped central spine extending vertically downward beneath the undersurfaces of said cantrails and with the head of said T-shaped central spine cooperating in the support of said roof, and
   a series of lateral supports extending between and mounted to said central spine and said cantrails, said lateral supports not extending vertically downward beneath the undersurfaces of said cantrails,
   said roof thereby being supported throughout its surface area, and between said front and rear frames and said cantrails, by a space frame system in which only the leg of said T-shaped central spine extends vertically downward inside said trailer beneath a phantom plane that includes the undersurfaces of said cantrails.

2. A trailer as claimed in claim 1 wherein the downwards extension of the web intermediate its extremities is between 1/20 and 1/40 of the length of the roof as taken between the inner sides of the front and rear frames.

3. A trailer as claimed in claim 2 wherein said downwards extension of said web is about 1/35 of the length of the roof.

4. The trailer as claimed in claim 2 wherein the T-shaped spine has an upper wide portion a lower narrow portion and an intermediate upwardly and outwardly expanding portion.

5. A trailer as claimed in claim 4 wherein said narrow portion is about 50 mm wide.

6. A trailer as claimed in claim 2 wherein said T-shaped spine has a lower extremity which slopes upwards from its lowest point towards the rear of the trailer.

7. A trailer as claimed in claim 6 wherein this rear 15% of said central web has its lower extremity sloping upwards towards the rear of the trailer.

8. A trailer as claimed in claim 1 wherein said T-shaped spine is hollow and is supported at least partly by a spigot extending from each of said front and rear frames.

9. A trailer as claimed in claim 1 including
   a fore and aft track fixed to each cantrail, and
   a side curtain drawably suspended from each of said tracks for opening and closing the interior of said trailer.

* * * * *